(12) United States Patent
Chen et al.

(10) Patent No.: US 8,651,511 B2
(45) Date of Patent: Feb. 18, 2014

(54) COLLAPSIBLE STROLLER

(75) Inventors: Hong-Bo Chen, Taipei (TW); Fu-Sian Yu, Taipei (TW)

(73) Assignee: BP Children's Products HK Co., Limited, Kowloon (HK)

( * ) Notice: Subject to any disclaimer, the term of this patent is extended or adjusted under 35 U.S.C. 154(b) by 405 days.

(21) Appl. No.: 13/064,071

(22) Filed: Mar. 4, 2011

(65) Prior Publication Data

US 2012/0074671 A1    Mar. 29, 2012

(30) Foreign Application Priority Data

Sep. 27, 2010    (CN) .......................... 2010 1 0514893

(51) Int. Cl.
B62B 7/06    (2006.01)

(52) U.S. Cl.
USPC .......................................... 280/642; 280/647

(58) Field of Classification Search
USPC ......... 280/638, 639, 642, 643, 644, 646, 647, 280/648, 649, 650, 657, 658, 47.34, 47.371, 280/47.38; 297/16.2
See application file for complete search history.

(56) References Cited

U.S. PATENT DOCUMENTS

| | | | | |
|---|---|---|---|---|
| 4,632,420 A * | 12/1986 | Miyagi | ........................ | 280/642 |
| 4,915,401 A * | 4/1990 | Severson et al. | ................ | 280/30 |
| 5,106,116 A * | 4/1992 | Chen | ............................ | 280/642 |
| 5,110,150 A * | 5/1992 | Chen | ............................ | 280/642 |
| 5,181,735 A * | 1/1993 | Onishi | .......................... | 280/642 |
| 5,197,753 A * | 3/1993 | Liu | ............................... | 280/642 |
| 5,669,625 A * | 9/1997 | Jane Cabagnero | ............ | 280/647 |
| 5,755,455 A * | 5/1998 | Chen et al. | .................... | 280/642 |
| 6,062,587 A * | 5/2000 | Cabagnero | .................... | 280/642 |
| 6,302,412 B1 * | 10/2001 | Worth et al. | ..................... | 280/30 |
| 6,666,473 B2 * | 12/2003 | Hartenstine et al. | .......... | 280/647 |
| 7,523,954 B2 * | 4/2009 | Dotsey et al. | ................. | 280/642 |
| 7,641,216 B2 * | 1/2010 | Cone, II | ........................ | 280/642 |
| 7,845,671 B2 * | 12/2010 | Cone, II | ........................ | 280/650 |
| 7,900,952 B2 * | 3/2011 | Cone, II | ........................ | 280/650 |
| 7,918,467 B2 * | 4/2011 | Cheng | ............................. | 280/38 |
| 8,042,828 B2 * | 10/2011 | Ageneau et al. | .............. | 280/642 |
| 8,066,300 B2 * | 11/2011 | Ohnishi | ........................ | 280/647 |
| 8,104,788 B2 * | 1/2012 | Cone, II | ........................ | 280/650 |
| 8,201,846 B2 * | 6/2012 | Yu et al. | ........................ | 280/650 |
| 8,210,562 B2 * | 7/2012 | Ohnishi | ........................ | 280/642 |
| 8,360,461 B2 * | 1/2013 | Henry | ........................... | 280/648 |

(Continued)

OTHER PUBLICATIONS

Search report as issued to the corresponding British Patent Application No. 1103585.4.

*Primary Examiner* — John R Olszewski
*Assistant Examiner* — Brodie Follman
(74) *Attorney, Agent, or Firm* — Bacon & Thomas, PLLC

(57) ABSTRACT

A collapsible stroller has a collapsing operation in width and front/rear directions that can be performed simultaneously. The collapsible stroller has a frame including a pair of front leg tubes and a pair of rear leg tubes pivotally collapsibly coupled to the front legs; a seat unit including a pair of seat side-tubes and a pair of backrest tubes; a first collapsing auxiliary assembly horizontally collapsibly disposed between lateral sides of the frame and operably coupled to the side-tubes of the site unit and the rear leg tubes; a second collapsing auxiliary assembly disposed between the rear leg tubes; and an operation unit operably coupled to the side-tubes of the seat unit and releasibly coupled to the rear leg tubes of the frame, thereby the two dimensional collapsing operation of the stroller can be performed by one hand of the user.

9 Claims, 10 Drawing Sheets

(56) References Cited

U.S. PATENT DOCUMENTS

| | | | |
|---|---|---|---|
| 8,414,012 B2* | 4/2013 | Chen et al. | 280/648 |
| 2003/0052475 A1* | 3/2003 | Suga et al. | 280/642 |
| 2004/0150174 A1* | 8/2004 | Lan | 280/47.4 |
| 2006/0145441 A1* | 7/2006 | Tomasi et al. | 280/47.371 |
| 2009/0121454 A1* | 5/2009 | Tomasi et al. | 280/642 |
| 2009/0134604 A1* | 5/2009 | Ohnishi | 280/649 |
| 2009/0200838 A1* | 8/2009 | Cone, II | 297/16.2 |
| 2010/0038871 A1* | 2/2010 | Cheng | 280/38 |
| 2010/0117315 A1* | 5/2010 | Yu et al. | 280/47.4 |
| 2010/0264628 A1* | 10/2010 | Ohnishi | 280/651 |
| 2011/0089670 A1* | 4/2011 | Henry | 280/647 |
| 2011/0156374 A1* | 6/2011 | Cheng | 280/642 |
| 2011/0175305 A1* | 7/2011 | Chen et al. | 280/30 |
| 2011/0227373 A1* | 9/2011 | Cone, II | 297/16.1 |
| 2012/0074671 A1* | 3/2012 | Chen et al. | 280/642 |

* cited by examiner

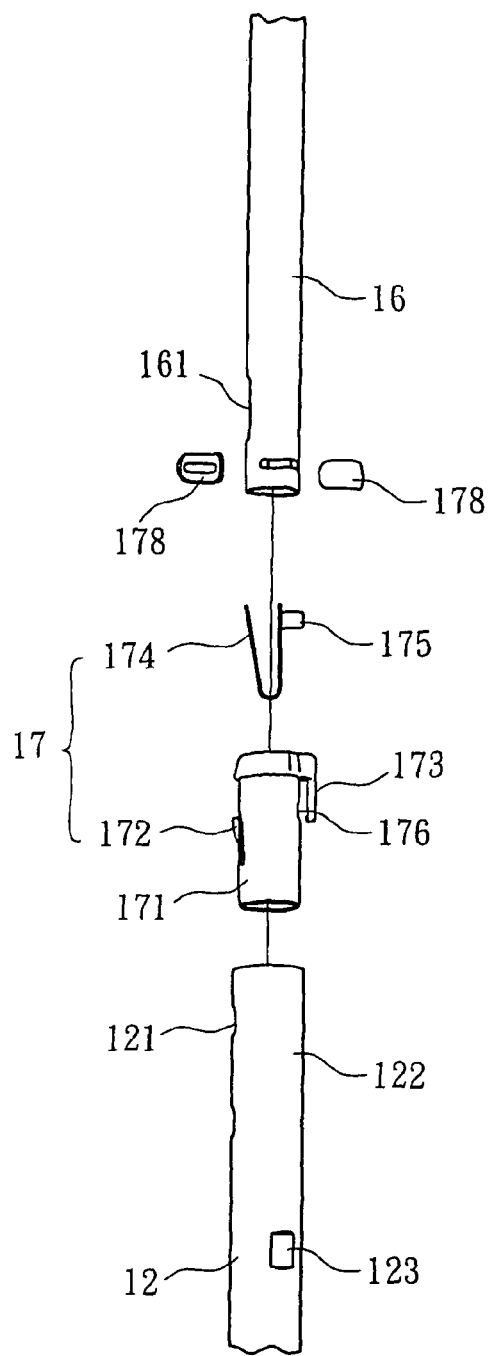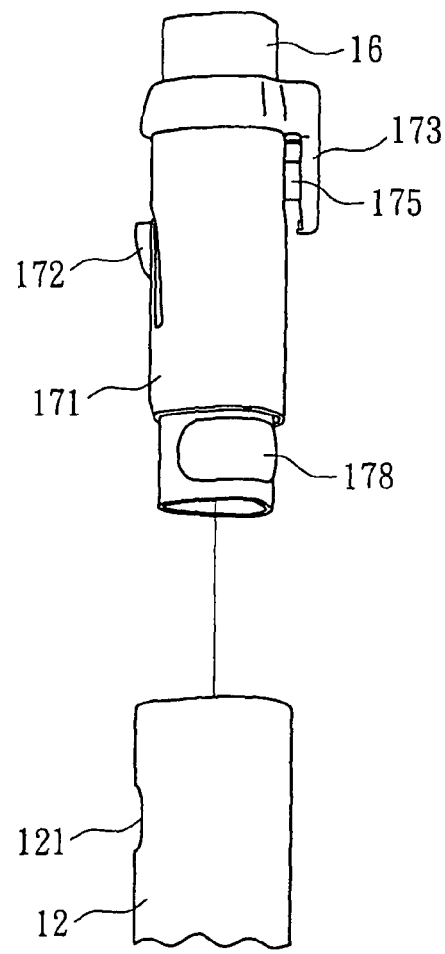
Fig. 4a
Fig. 4b

United States Patent US 8,651,511 B2

COLLAPSIBLE STROLLER

FIELD OF THE INVENTION

The present invention relates generally to a collapsible stroller, and more specifically to a collapsible stroller whose collapsing operation in both width direction and front/rear direction can be performed simultaneously with just one hand.

BACKGROUND OF THE INVENTION

A stroller becomes necessary equipment for a family that has a baby when the parents need to take the baby to the outdoors, and it is usually designed in a collapsible form to facilitate handling/storing. For instance, U.S. patent publication No. 2003/0201626 A1 has disclosed a collapsible stroller. However, although this type of collapsible strollers are able to collapse in height direction and front/rear direction (depth direction), the size in the width direction of the stroller is not reduced, that is, the width of the stroller remains unchanged after the stroller being collapsed. Therefore, reducing the volume of a collapsed stroller to a maximum degree is not fully achieved.

U.S. Pat. No. 7,178,822 disclosed a stroller frame structure allowing the stroller being collapsed in two different directions. Specifically, this collapsible stroller frame structure can be collapsed in both the front/rear direction (depth direction) and width direction so as to reduce the volume of the collapsed stroller. Although this type of collapsible stroller design allows the width of the stroller to be reduced after being collapsed, it requires two steps and/or two hands of the user to perform the collapsing operation. Therefore, from simplifying the collapsing operation point of view, this type of stroller obviously does not meet the easy-to-use requirement.

Therefore, there exists a need for a collapsible stroller that the collapsing operation can be operated with one hand of a user and the volume of the collapsed stroller can be minimized.

SUMMARY OF THE INVENTION

Accordingly, one object of the present invention is to provide a collapsible stroller whose collapsing operation in both width direction and front/rear direction can be performed simultaneously with just one hand of a user.

Another object of the present invention is to provide a collapsible stroller that allows the size in the width dimension (lateral dimension), height dimension and front/rear dimension (longitudinal dimension) to be reduced while collapsing the stroller such that the volume of the collapsed stroller can be minimized.

To achieve these and other objects, a collapsible stroller is provided, the collapsible stroller comprising:
 a frame, including:
  two front leg tubes, each of the front leg tubes having a first end and a second end on which a wheel is rotatably attached; and
  two rear leg tubes, each of the rear leg tubes having a first end pivotally coupled to a corresponding front leg tube at a vicinity of the first end thereof to form a lateral side of the frame respectively and a second end on which a wheel is rotatably attached;
 a seat unit including two seat side-tubes, each of the side-tubes having a first end pivotally coupled to a corresponding front leg tube and a second end;
 a collapsing operation unit operably coupled to the seconds of the seat side-tubes,
 the collapsible stroller being characterized in that:
  when the second ends of the seat side-tubes respectively coupled to a corresponding rear leg tube on the same side of the frame, the collapsing operation unit operably locks the seat side-tubes to the rear leg tubes, and when the collapsing operation unit unlocks and disengages the seat side-tubes from the rear leg tubes, the second ends of the seat side-tubes separate with the rear leg tubes and pivot relative to the front leg tubes.

In this embodiment, the first end of each of the front leg tubes has a substantially L-shaped handle tube telescopely coupled to the front leg tube through a handle tube adjustment means. The stroller further includes a second collapsing auxiliary assembly lateral collapsibly disposed between the rear leg tubes. The second collapsing auxiliary assembly includes an upper connecting block, a guiding tube extending downwardly from a lower end of the upper connecting block, two upper horizontal members each pivotally coupled between a lateral side of an upper end of the upper connecting block and a corresponding rear leg tube, a lower connecting block mounted to a lower end of the guiding tube, two lower horizontal members each pivotally coupled between a lateral side of the lower connecting block and a lower end portion of a corresponding rear leg tube, and two connecting members each having one end pivotally coupled to a lower end of a lateral side of the upper connecting block and another end pivotally coupled, together with a corresponding lower horizontal member, to the lower end portion of a corresponding rear leg tube.

The collapsing operation unit includes a actuating member and two locking members each pivotally coupled to one end of the actuating member for operably connected to a corresponding seat side-tube, wherein the actuating member includes an intermediate portion and two connecting portions, one end of each of the connecting portions being pivotally coupled to one end of the intermediate portion and the other end being pivotally coupled to a corresponding locking member.

The locking member includes a locking hook portion formed at the end to be locking to the seat later tube, and a bias means disposed between the locking member and the seat side-tube for biasing the locking member toward the seat side-tube to thereby allow the locking hook portion being operably locked to/unlocked and disengaged from the corresponding rear leg tube.

According to another embodiment of the present invention, the actuating member of the collapsing operation unit is an one-piece member that is made of a elastically deformable plastic material. The seat unit further includes two crossing members and two backrest tubes, each of the backrest tube being pivotally coupled to a corresponding seat side-tube and the crossing members being foldably disposed between the backrest tubes to thereby provide the backrest of the seat unit additional mechanical strength and facilitate the folding/expanding operation of the bake-rest tubes.

The collapsible stroller further includes a first collapsing auxiliary assembly lateral collapsibly disposed between lateral sides of the frame. The first collapsing auxiliary assembly includes two crossing tubes and two first linking-up members, wherein a first end of each of the crossing tubes is pivotally coupled to a corresponding front leg tube and a second end thereof is pivotally coupled to the second end of the seat side-tube at the lateral side of the frame opposite to the corresponding front leg tube to which the second end is coupled, and one end of each of the first linking-up members is pivotally coupled a seat side-tube and the other end is pivotally coupled to a corresponding rear leg tube to thereby allow the first collapsing auxiliary assembly to facilitate the collapsing operation of the stroller in both the lateral direction (width direction) and the front/rear direction.

Features and objects of the present invention other than the above will become clear by reading the description of the present specification with reference to the accompanying drawings.

BRIEF DESCRIPTION OF THE DRAWINGS

For a more complete understanding of the present invention and the advantages thereof, reference is now made to the following description taken in conjunction with the accompanying drawings in which illustrative and non-imitative embodiments are shown, wherein:

FIGS. 4a-4d are drawings illustrating the structure of the handle tube adjusting means, wherein FIG. 4a is an exploded perspective of the handle tube adjusting means, FIG. 4b is an assembled perspective view, FIGS. 4c and 4d are cross-sectional views showing the locked state and unlocked state of the handle tube adjusting means respectively;

DETAILED DESCRIPTION OF THE INVENTION

Figure 1:
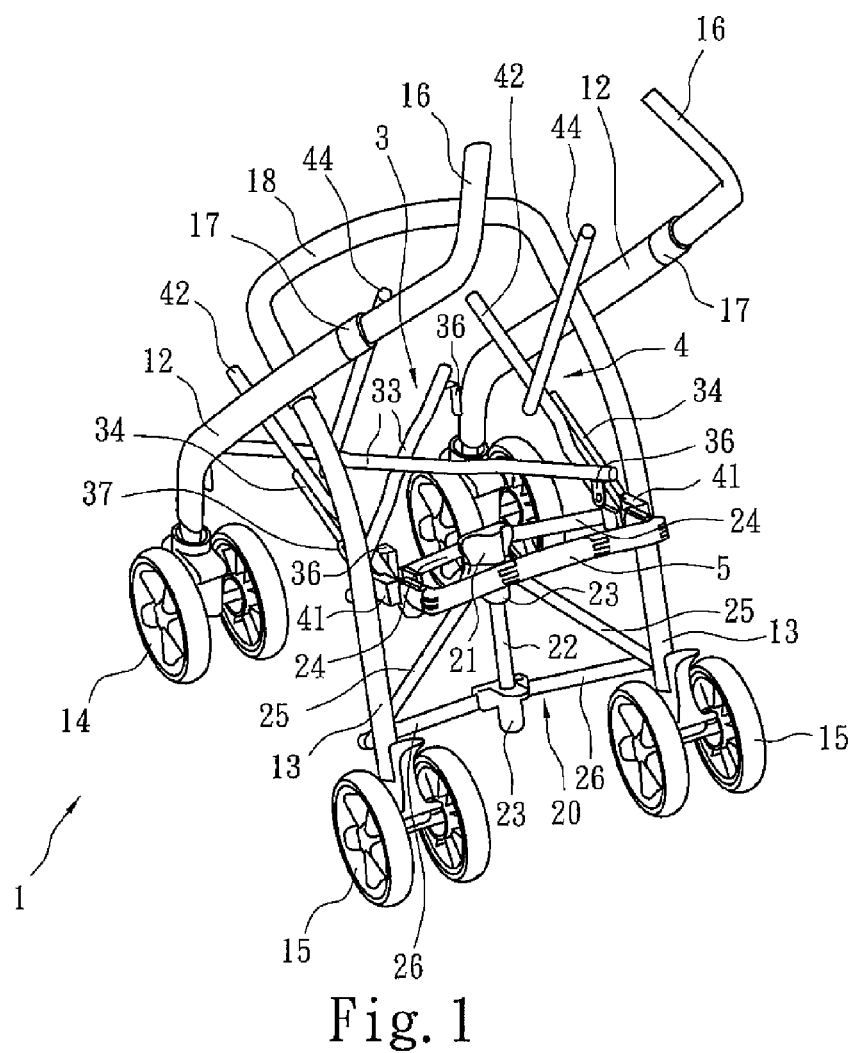
FIG. 1 is a schematic perspective view illustrating a collapsible stroller according to a first embodiment of the present invention.

Referring now to the drawings in which preferred embodiments of the present invention are illustrated to describe the present invention.

FIG. 1 is a schematic perspective view illustrating a collapsible stroller according to a first embodiment of the present invention. As shown in FIG. 1, the collapsible stroller mainly comprises a frame 1, a seat unit 4, a first collapsing auxiliary assembly 3, a collapsing operation unit 5 and a second collapsing auxiliary assembly 20. The frame 1 mainly includes two front leg tubes 12 and two rear leg tubes 13, wherein each of the front leg tubes 12 has a front leg tube lower end portion and a front leg tube upper end portion, and each of the rear leg tubes 13 has a rear leg tube lower end portion and a rear leg tube upper end portion. The upper end portion of each of the rear leg tubes 13 is pivotally coupled to the upper end portion of a corresponding front leg tube 12 to form a lateral side of the frame 1 (i.e., the left/right side of the frame 1). Additionally, a front wheel 14 is rotatably attached to the lower end of each of the front leg tubes 12 and a rear wheel 15 is rotatably attached to the lower end of each of the rear leg tubes 13. As seen in FIG. 1, a substantially L-shaped handle tube 16 is telescopely and adjustably received in the upper end portion of each of the front leg tubes 12 through a handle tube adjusting means 17 to adjust a length of the handle tube 16 relative to the front leg tube 12 by sliding the handle tube 16 relative to the front leg tube 12. In addition, a flexible guard member 18 (e.g., a guard member made of a soft plastic material) is provided between the upper end portions of the two rear leg tubes 13.

Figure 2:
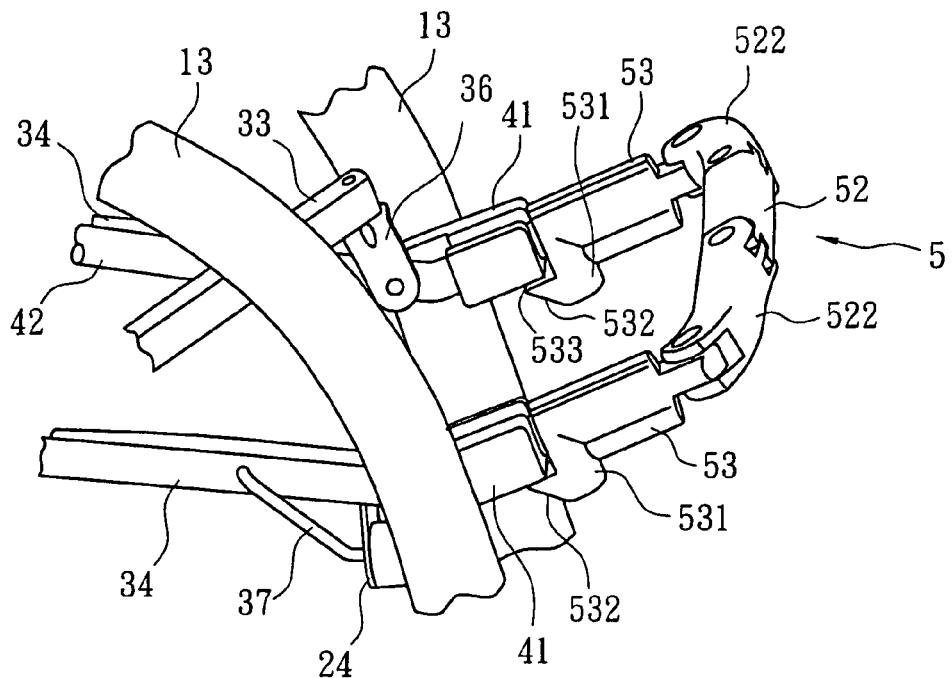
FIG. 2 is an enlarged perspective view showing the, collapsing operation unit of the collapsible stroller according to the first embodiment of the present invention.
Figure 3:
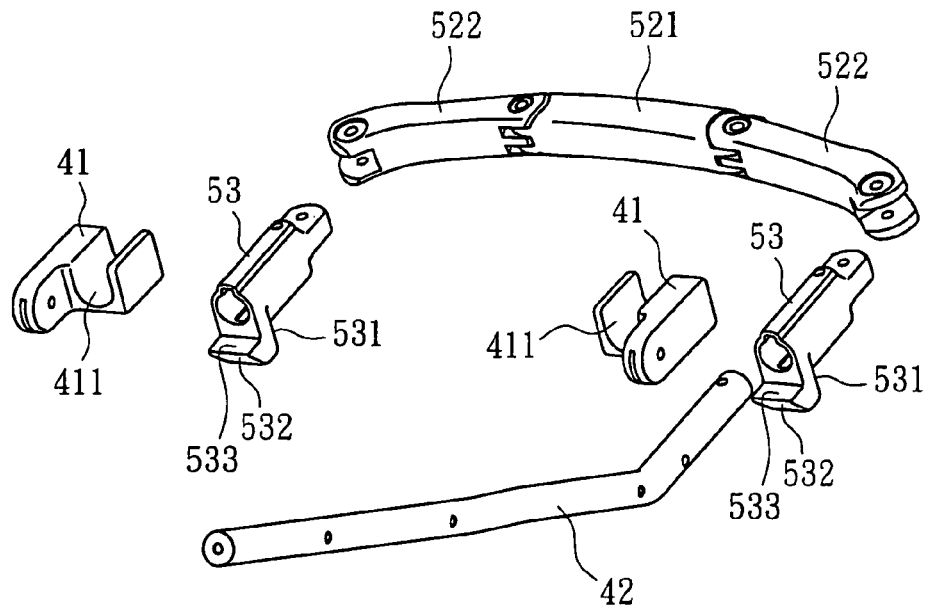
FIG. 3 is an exploded perspective of the collapsing operation unit illustrated in FIG. 2.

The seat unit 4 mainly comprises two seat side-tubes 42 disposed opposite to each other, a front end of each of the seat side-tubes 42 being coupled to a corresponding front leg tube 12 and a rear end thereof being detachably coupled to a corresponding rear leg tube 13 through a seat tube supporting member 41 mounted on the rear leg tube 13. As shown in FIGS. 2 and 3, the seat tube supporting member 41 has a groove 411 for detachably supporting the rear end of the seat side-tube 42. The seat unit 4 further comprises two backrest tubes 44 each having an end pivotally coupled to a corresponding seat side-tube 42.

The first collapsing auxiliary assembly 3 includes two crossing tubes 33 each having a first end pivotally coupled to a front leg tube 12 through a reversed L-shaped connecting member 36 and a second end pivotally coupled to a rear end of a seat side-tube 42 through another connecting member 36 at a lateral side of the frame 1 opposite to the front leg tube 12 to which the first end is coupled, thereby the two crossing tubes 330 intersecting at a substantially center of the frame 1 to allow the lateral sides of the frame 1 to be collapsed toward each other or expanded away from each other by a scissor-like movement of the crossing tubes 33.

The first collapsing auxiliary assembly 3 includes two first linking-up members 34 each being disposed at an outer side of a corresponding seat side-tube 42 with a front end thereof pivotally being coupled to a substantially middle portion of the seat side-tube 42 and a rear end thereof being pivotally coupled to a corresponding seat tube supporting member 41 so as to allow the rear leg tubes 13 to be moved toward the front leg tubes 12 by the first linking-up members 34 driven by a collapsing movement of the two seat tubes 42 during a collapsing operation of the stroller.

Additionally, the first collapsing auxiliary assembly 3 includes two second linking-up members 37 each having a first end pivotally to the rear end of a corresponding first linking-up members 34 and a second end pivotally coupled a corresponding upper horizontal member 24 of the second collapsing auxiliary assembly 20 at a vicinity of the coupling location of the upper horizontal member 24 and the rear leg tube 13.

As shown in FIG. 1, the second collapsing auxiliary assembly 20 is disposed between the two rear leg tubes 13 closer to the lower ends to which the rear wheels 15 are attached. The second collapsing auxiliary assembly 20 includes an upper connecting block 21, a guiding tube 22 extending downwardly from a lower end of the upper, connecting block 21, two upper horizontal members 24 each pivotally coupled between a lateral side of an upper end of the upper connecting block 21 and a corresponding rear leg tube 13, a lower connecting block 23 mounted to a lower end of the guiding tube 22, two lower horizontal members 26 each pivotally coupled between a lateral side of the lower connecting block 23 and a lower end portion of a corresponding rear leg tube 13, and two connecting members 25 each having one end pivotally coupled to a lower end of a lateral side of the upper connecting block 21 and another end pivotally coupled, together with a corresponding lower horizontal member 26, to the lower end portion of a corresponding rear leg tube 13. With the second collapsing auxiliary assembly 20 described above, the lateral sides of the frame 1 may be moved toward each other more smoothly during the collapsing operation of the stroller.

Next, the structure of the collapsing operation unit 5 will be described with reference to FIGS. 2 and 3. The collapsing operation unit 5 mainly includes a deformable actuating member 52 and two locking members 53 each being pivotally coupled to one end of the actuating member 52. In the embodiment illustrated in FIGS. 2 and 3, the actuating member 52 consists of three portions, namely an intermediate portion 521 and two connecting portions 522 each having a first end pivotally coupled to one end of the intermediate portion 521 and a second end pivotally coupled to a corresponding locking member 53. Each locking member 53 has a locking hook 531 formed at one end thereof that is opposite to the end coupled to the connecting portion 522. The locking hook 531 has a guiding face 532 inclined from a front end toward a rear end of the locking hook 531 and a substantially planer engaging face 533. Each locking member 53 is movably fitted to a rear end of a corresponding seat side-tube 42. A biasing means (not shown) is disposed between the locking member 53 and the rear end of a corresponding seat side-tube 42 for biasing the locking member 53 toward the seat side-tube 42 such that when the seat side-tube 42 is supported on the seat tube supporting member 41, the engaging face 533 of the locking hook 531 of the locking member 53 engages with a bottom of the seat tube supporting member 41 to thereby lock the seat side-tube 42 to the seat tube supporting member 41 (see FIG. 2).

Figure 4C:
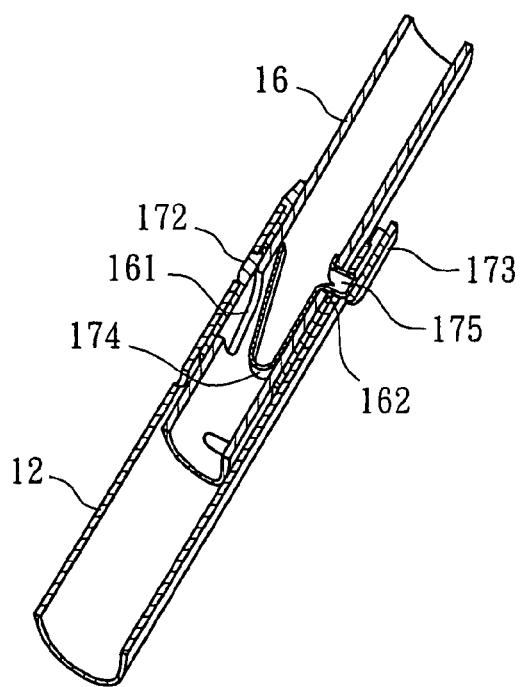
Figure 4D:
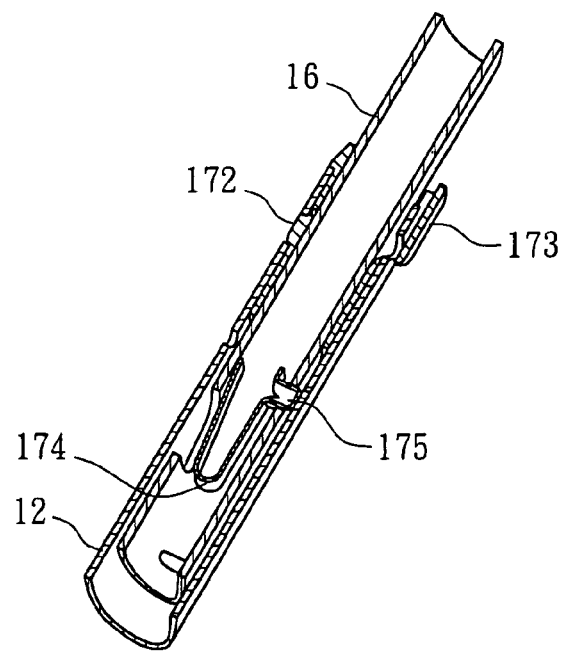

FIGS. 4a-4d are drawings illustrating the structure of the handle tube adjusting means 17, wherein FIG. 4a is an exploded perspective of the handle tube adjusting means 17; FIG. 4b is an assembled perspective view of the handle tube adjusting means 17; FIGS. 4c and 4d are cross-sectional views showing the locked state and unlocked state of the handle tube adjusting means 17 respectively. As shown in FIG. 4a, the handle tube adjusting means 17 mainly includes a hollow cylindrical main body 171, a substantially U-shaped spring member 174 and two setting plastic members 178. A protruding portion 172 is formed on an outer face of a peripheral wall of the main body 171 and a cut-out is formed in the peripheral wall of the main body 171 partially surround the protruding portion 172 such that a portion of the peripheral wall of the main body 171 that contains the protruding portion 172 forms a spring member. A resilient pressing portion 173 is formed at a first end of the main body 171 and it extends downwardly from the first end of the main body 171. A hole 176 is formed in the peripheral wall of the main body 171 at a position corresponding to the resilient pressing portion 173. An engaging protrusion 175 is protruding outwardly from a free end of the substantially U-shaped spring member 174.

In assembly, the main body 171 is firstly fitted onto the end of the handle tube 16 which is to be connected to the front leg tube 12. A hole 161 is formed in the tube wall of the handle tube 16 at a position corresponding to the protruding portion 172 and another hole 162 is formed in the tube wall of the handle tube 16 at a position corresponding to the hole 176 in the peripheral wall of the main body 171 and the resilient pressing portion 173 (see FIGS. 4c and 4d). Next, the substantially U-shaped spring member 174 is put into the handle tube 16 until its engaging protrusion 175 align and engage with the hole 162 of the handle tube 16 and the hole 176 of the main body 171. Then, the setting plastic members 178 are installed on the handle tube 16 to become the state shown in FIG. 4b. Next, with the engaging protrusion 175 being pressed down, the handle tube 16, on which the handle tube adjusting means 17 is installed, is inserted in the front leg tube 12 until the protruding portion 172 of the main body 171 and the engaging protrusion 175 of the spring member 174 align and engage with the holes 121 and 122 formed in the tube wall of the front leg tube 12 respectively so as to connect the handle tube 16 to the front leg tube 12 as shown in FIG. 4c.

When the handle tube 16 needs to be further received in the front leg tube 12, the resilient pressing portion 173 is pressed down to cause the engaging protrusion 175 of the spring member 174 to disengage from the hole 122 of the front leg tube 122 and the hole 176 of the main body 171 and thus allow the handle tube 16 to be slide further into the front leg tube 12. Additionally, in order to limit the length that the handle tube 16 may be inserted into the front leg tube 12, one or more recess portions 123 may be formed on the tube wall of the front leg tube 12 at positions a distance from the tube end of the front leg tub 12.

Figure 5A:
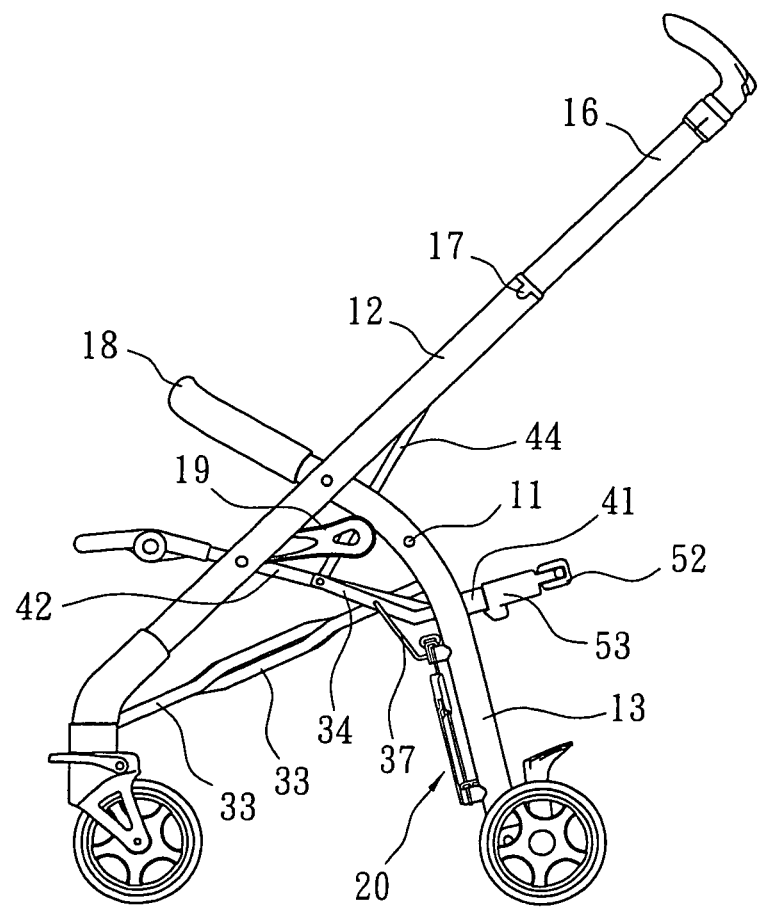
FIGS. 5a-5c are drawings illustrating the operation states of collapsible stroller according to the first embodiment of the present invention.
Figure 5B:
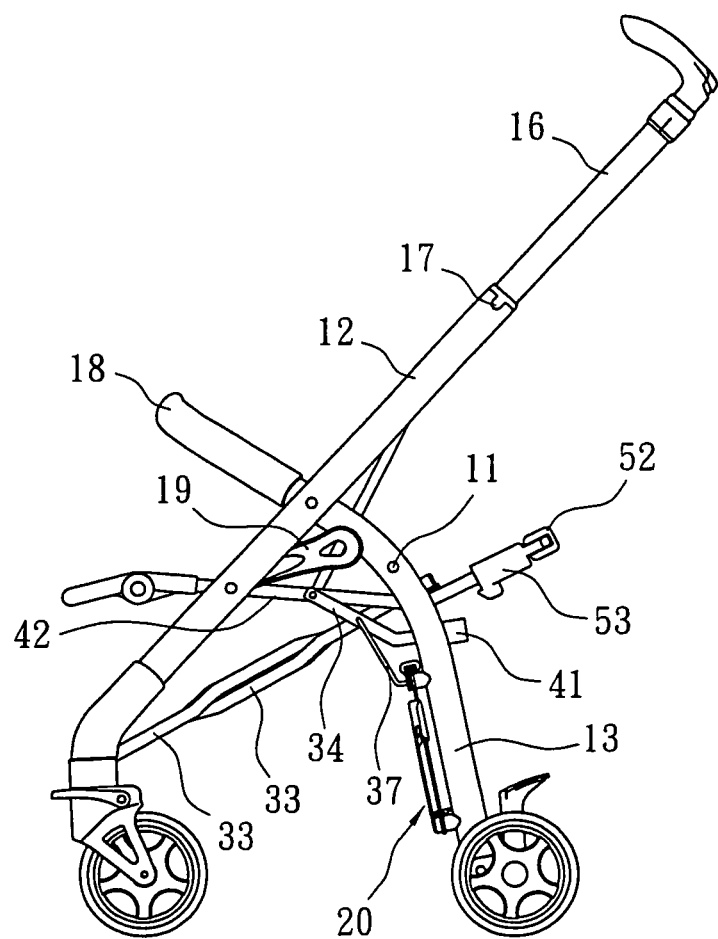
Figure 5C:
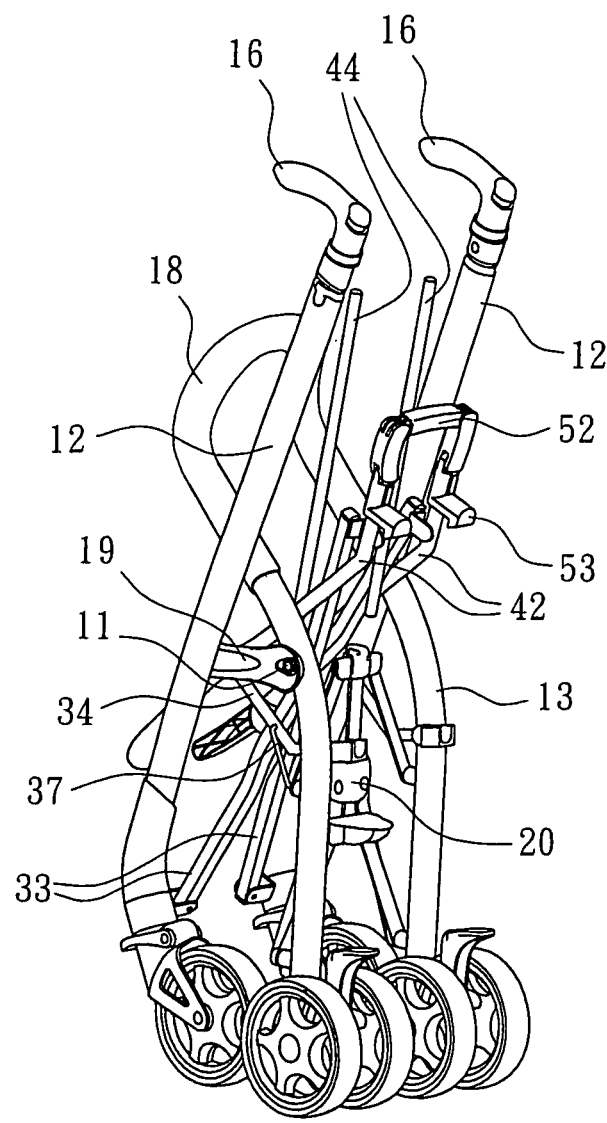

Next, a collapsing operation of the stroller according to the first embodiment of the present invention will be describe with reference to FIGS. 5a-5c.

A fully extended state of the stroller is illustrated in FIG. 5a and in this state the two seat side-tubes 42 of the seat unit 4 are in a locked state with the seat tube supporting members 41 as shown in FIG. 2. When the stroller needs to be collapsed, user only needs to hold the intermediate portion 521 of the actuating member 52 of the collapsing operation unit 5 with his hand and pull backward to cause the locking members 53, which are pivotally coupled to the actuating members 52, to slide backward to disengage the locking members 53 from the corresponding seat tube supporting members 41. Then, as shown in FIG. 5b, pulling the actuating member 52 upward to cause the two seat side-tubes 42 to rotate upwardly about the coupling points that they coupled to the front leg tubes 12. At this time, because the front end of the first linking-up members 34 pivotally coupled to the seat side-tubes 42, this upward rotation movement of the seat side-tubes 42 will cause the front end of the first linking-up members 34 that are coupled to the seat side-tubes 42 to move closer to the front leg tubes 12. Additionally, the rear end of the first linking-up members 34 rotate downwardly because the rear end of the first linking-up members 34 pivotally coupled to the seat tube supporting members 41 that are fixed to the rear leg tubes 13 and the weight of the rear wheels 15 exerts on the rear leg tubes 13, and this will cause the rear leg tubes 13 to move toward the front leg tubes 12 to thereby allow the stroller to collapses in the front/rear direction.

Additionally, because the second linking-up members 37 are coupled between the first linking-up members 34 at a position closer to the seat tube supporting members 41 and the upper horizontal members 24 of the second collapsing auxiliary assembly 20, this downward rotation movement of the first linking-up members 34 will cause the end of the upper horizontal members 24 that coupled to the rear leg tubes 13 to move downward and the end of the upper horizontal members 24 that coupled to the upper connecting block 21 to move upward, and thus cause the rear leg tubes 13 to move toward each other with the help of the guiding tube 22 of the second collapsing auxiliary assembly 20. Moreover, because the rear leg tubes 13 are connected to the front leg tubes 12 respectively, this collapsing movement of the rear leg tubes 13 toward each other will cause the front leg tubes 12 to move toward each other as well. Additionally, because the front end of the crossing tubes 33 of the first collapsing auxiliary assembly 3 is respectively coupled to the front leg tubes 12 and the rear end thereof is respectively coupled the seat side-tubes 42, this collapsing movement of the front leg tubes 12 toward each other will cause the front ends of the crossing members 33 to close to each other and in turn cause the seat side-tubes 42 to close to each other through a scissor-like movement of the crossing members 33, and further cause the two connecting portions 522 that coupled to the intermediate portion 521 of the actuating member 52 of the collapsing operation unit 5 to pivot inwardly and become parallel to each other, and allow the stroller to be collapsed in width direction. After that, the handle tubes 16 may be retracted into the front leg tubes 12 by operating the he handle tube adjusting means 17 to reduce the dimension in height direction. Then, the collapsed stroller may be maintained in this fully collapsed state by engaging a first fastening member 11 provided on the rear leg 13 to a second fastening member 19 provided on the front leg tube 12, as shown in FIG. 5c.

When need to use the stroller, the user only needs to disengage the first fastening member 11 from the second fastening member 19 to release the front leg tubes 12 from the rear leg tubes 13, push the collapsing operation unit 5 backward and downward to make the front leg tubes 12 and the rear leg tubes 13 to move away from each other and allow the stroller to expand in the front/rear direction, and step on the lower connecting block 23 of the second collapsing auxiliary assembly 20 downwardly with his leg to expand the upper horizontal members 24 and lower horizontal members 26 of the second collapsing auxiliary assembly 20 laterally so as to allow the stroller to expand in the width (lateral) direction and cause the stroller to return to the fully expanded state as illustrated in FIG. 1, in which state the locking members 53 of the collapsing operation unit 5 are once again in lock with the seat tube supporting members 41.

Figure 6:
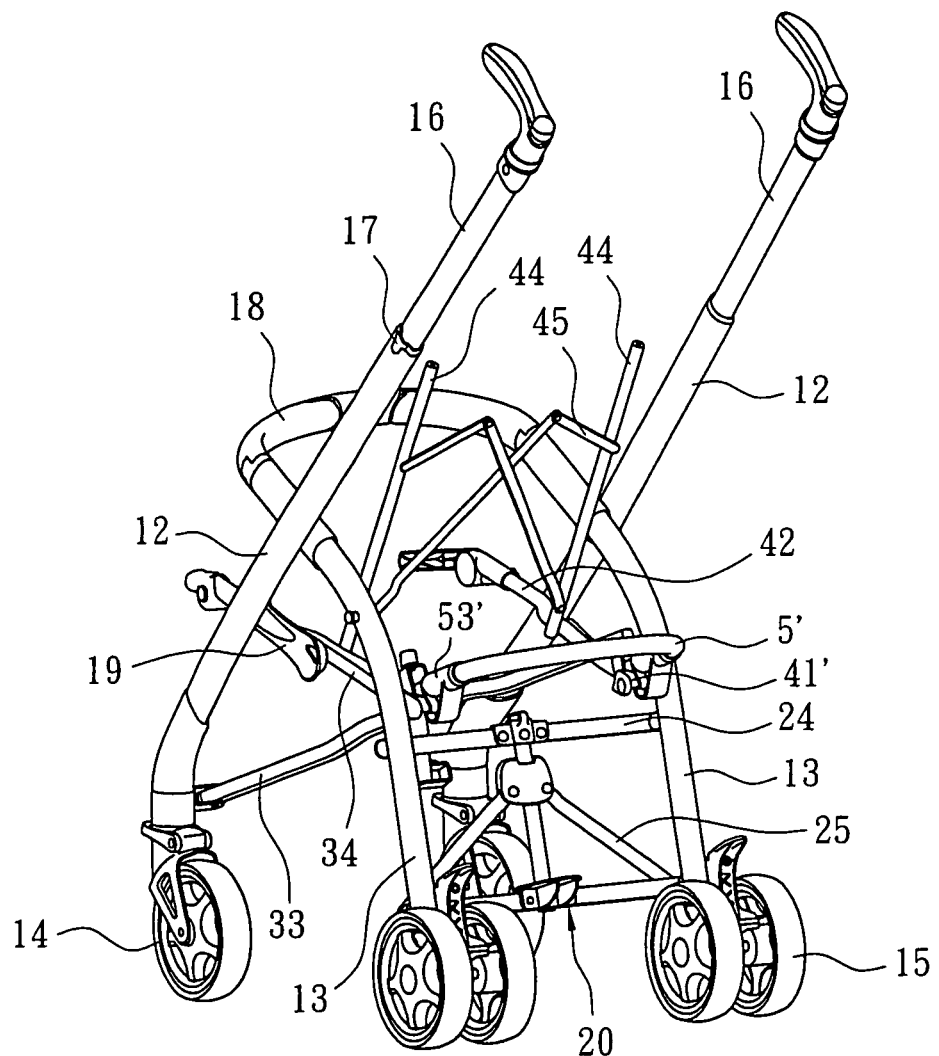
FIG. 6 is a schematic perspective view illustrating a collapsible stroller according to a second embodiment of the present invention.
Figure 7:
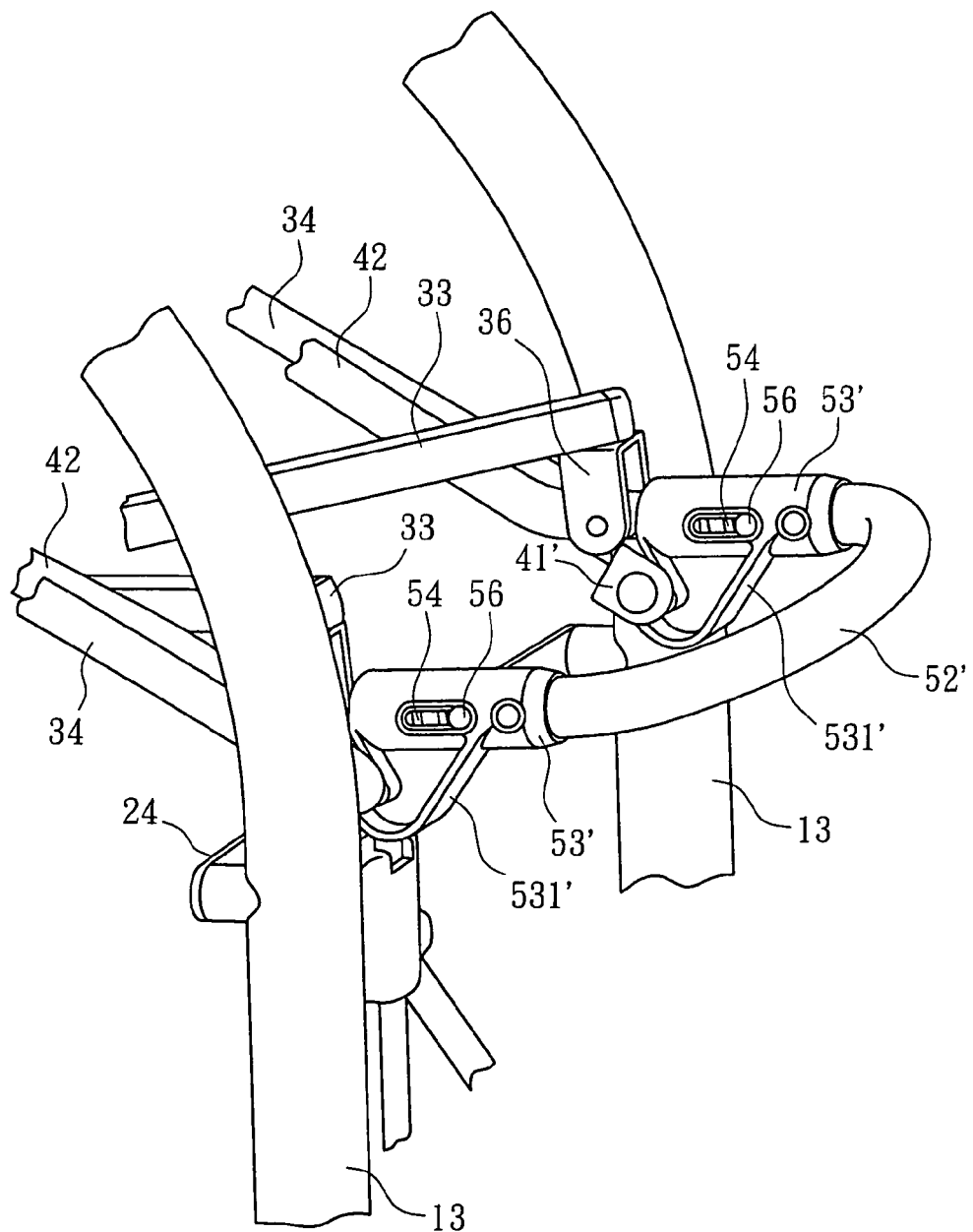
FIG. 7 is an enlarged perspective view showing the collapsing operation unit of the collapsible stroller according to the second embodiment of the present invention.
Figure 8A:
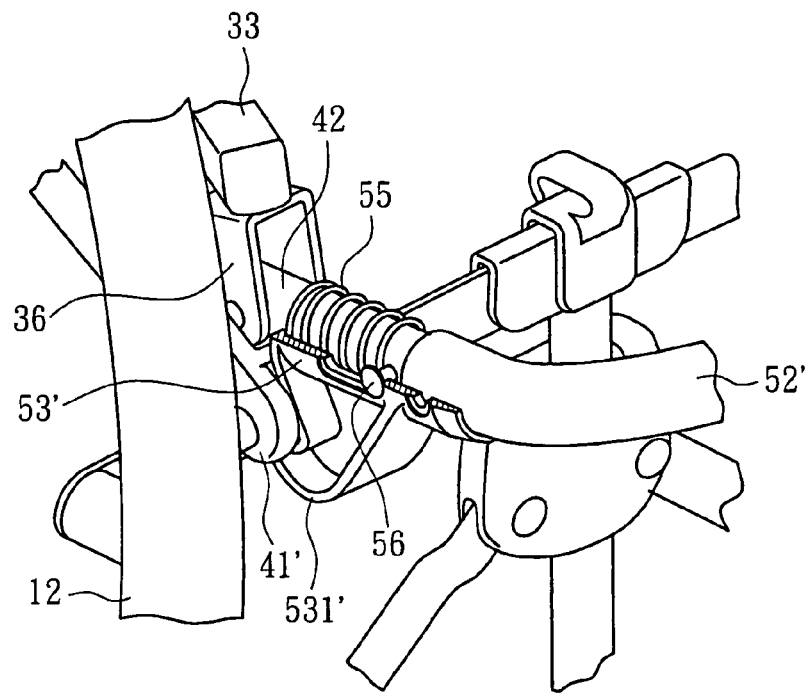
FIGS. 8a-8b are drawings illustrating the operation states of collapsible stroller according to the second embodiment of the present invention.
Figure 8B:
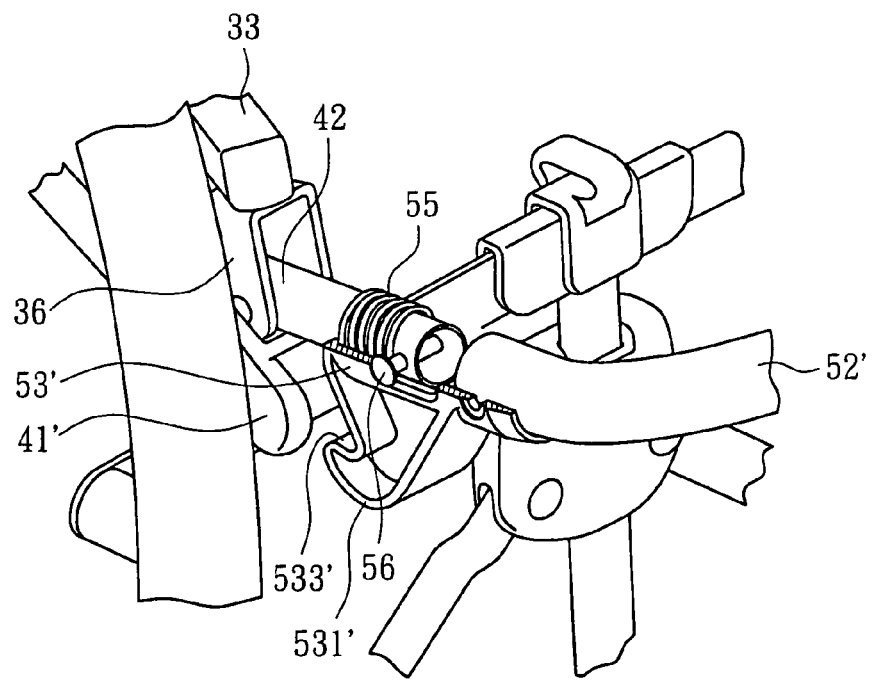

Next, a stroller according to a second embodiment of the present invention will be described with reference to FIGS. 6-8, in which FIG. 6 is a schematic perspective view of the stroller according to the second embodiment; FIG. 7 is an enlarged perspective view of the collapsing operation unit 5' according to the second embodiment; FIGS. 8a and 8b are partially cut away enlarged perspective views of the collapsing operation unit 5' showing the collapsing operation unit 5' in a locked and unlocked states respectively.

Because the main differences between the first and the second embodiments reside in the design of the collapsing operation unit 5' and the back-rest of the seat unit, only the differences between the first and the second embodiments are described in the following description and for the structures that are the same in both the first and second embodiments will be omitted for simplicity. Additionally, same reference numerals will be used in FIGS. 6-8 for components of the second embodiment that are the same as those of the first embodiment.

As shown in the drawings, the collapsing operation unit 5' of this embodiment mainly comprises a one-piece actuating member 52' and two cylindrical shaped locking members 53' each fixed to one end of the actuating member 52' respectively. In this embodiment, the one-piece actuating member 52' is made of flexible plastic material. Two longitudinal elongated openings 54 are formed in the peripheral wall of each of the locking members 53' at radically symmetrical positions and a locking hook 531' extending downwardly from the peripheral wall wherein a planer horizontal engaging face 533' is formed at the hook end of the locking hook 531'. One collapsing operation unit 5' of this embodiment is operably mounted to each of the seat side-tubes 42 by mounting a locking members 53' to a rear end of the seat side-tube 42 and passing a rivet 56 through two longitudinal elongated openings 54 of the locking member 53' and the seat side-tube 42. Additionally, a core spring 55 is disposed in the locking member 53' and fitted on the seat side-tube 42 between the rivet 56 and an end wall of the cylindrical shaped locking members 53' as shown in FIG. 8a to thereby form a biasing means so that when the seat side-tube 42 is supported on the seat tube supporting member 41', the engaging face 533' of the locking hook 531' of the locking member 53' engages with the bottom of the seat tube supporting member 41' to thereby lock the seat side-tube 42 to the seat tube supporting member 41', as shown in FIG. 8a.

The other difference between this embodiment and the first embodiment is the backrest of the seat unit. As shown in FIG. 6, two crossing members 45 are pivotal collapsibly provided between the two backrest tubes 44 to provide additional mechanical strength to the backrest and to facilitate the collapsing movement of the two backrest tubes 44 during the collapsing operation of the stroller.

Because the first collapsing auxiliary assembly of the embodiment is the same as the first collapsing auxiliary assembly 3 of the first embodiment, thus when needs to collapse the stroller of this embodiment, the user only needs to hold the actuating member 52' of the collapsing operating unit 5' and pull it backward to cause the locking member 53' that connected to the actuating member 52' to slide backward to disengage the locking member 53' from the seat tube supporting member 41' (see FIG. 8b), and then pull the actuating member 52' upward to execute a collapsing operation the same as that of the first embodiment described above to collapse the stroller.

Although the present invention has been described above according to the preferred embodiment thereof, this does not mean that the scope of the present invention is limited to specific structure described above. It will be apparent to people skilled in this art that many modifications can be made to the disclosed structures without departing from the scope of the invention. Therefore, it is the intent of the appended claims to cover all such variations and modifications as come within the sprit and scope of this invention.

What is claimed is:

1. A collapsible stroller, comprising:
a frame, including:
two front leg tubes, each of the front leg tubes having a first end and a second end on which a wheel is rotatably attached; and
two rear leg tubes, each of the rear leg tubes having a first end pivotally coupled to the front leg tube correspondingly at a vicinity of the first end thereof to form a lateral side of the frame respectively and a second end on which a wheel is rotatably attached;
a seat unit including two seat side-tubes, each of the side-tubes having a first end pivotally coupled to the front leg tube correspondingly and a second end;
a collapsing operation unit operably coupled to the second ends of the seat side-tubes,
the collapsible stroller being characterized in that:
when the second ends of the seat side-tubes are respectively coupled to rear leg tubes on the corresponding sides of the frame, the collapsing operation unit operably locks the seat side-tubes to the rear leg tubes, and when the collapsing operation unit unlocks and disengages the seat side-tubes from the rear leg tubes, the second ends of the seat side-tubes separate with the rear leg tubes and pivot relative to the front leg tubes.

2. A collapsible stroller according to claim 1, wherein the first end of each of the front leg tubes has a substantially L-shaped handle tube telescopically coupled to the front leg tube through a handle tube adjustment means.

3. A collapsible stroller according to claim 1, further comprising a second collapsing auxiliary assembly lateral collapsibly disposed between the rear leg tubes, wherein the second collapsing auxiliary assembly comprises an upper connecting block, a guiding tube extending downwardly from a lower end of the upper connecting block, two upper horizontal members each pivotally coupled between a lateral side of an upper end of the upper connecting block and the corresponding rear leg tube, a lower connecting block mounted to a lower end of the guiding tube, two lower horizontal members each pivotally coupled between a lateral side of the lower connecting block and a lower end portion of the corresponding rear leg tube, and two connecting members each having one end pivotally coupled to a lower end of a lateral side of the upper connecting block and another end which together with a corresponding lower horizontal member are pivotally coupled to the lower end portion of a corresponding rear leg tube.

4. A collapsible stroller according to claim 1, wherein the collapsing operation unit includes an actuating member and two locking members each pivotally coupled to one end of the actuating member to be operably connected to each of the corresponding seat-side tubes, and the actuating member comprises an intermediate portion and two connecting portions, one end of each of the connecting portions being pivotally coupled to one end of the intermediate portion and the other end being pivotally coupled to the corresponding locking member.

5. A collapsible stroller according to claim 1, wherein the collapsing operation unit includes an actuating member and two locking members each pivotally coupled to one end of the actuating member to be operably connected to a corresponding seat side-tube, and the actuating member is an one-piece member that is made of a elastically deformable plastic material.

6. A collapsible stroller according to claim 4 or 5, wherein the locking member comprises a locking hook portion which is formed at the end to be locking to the seat side-tube and arranged to be operably locked to/unlocked from the corresponding rear leg tube.

7. A collapsible stroller according to claim 1, wherein the seat unit further comprises two crossing members and two backrest tubes, each of the backrest tube being pivotally coupled to each of the corresponding seat-side tubes and the crossing members being collapsibly disposed between the backrest tubes to thereby provide the backrest of the seat unit additional mechanical strength and facilitate the collapsing/expanding operation of the bake-rest tubes.

8. A collapsible stroller according to claim 1, further comprising a flexible guard member provided between the first ends of the two rear leg tubes.

9. A collapsible stroller according to claim 1, further comprising a first collapsing auxiliary assembly lateral collapsibly disposed between lateral sides of the frame, wherein the first collapsing auxiliary assembly comprises two crossing tubes and two first linking-up members, wherein a first end of each of the crossing tubes is pivotally coupled to the corresponding front leg tube and a second end thereof is pivotally coupled to the second end of the seat side-tube at the lateral side of the frame opposite to the corresponding front leg tube to which the second end is coupled, and one end of each of the first linking-up members is pivotally coupled the seat side-tube and the other end is pivotally coupled to the corresponding rear leg tube to thereby allow the first collapsing auxiliary assembly to facilitate the collapsing operation of the stroller in both the lateral direction and the front/rear direction.

* * * * *